US010685542B2

(12) United States Patent
Trani et al.

(10) Patent No.: US 10,685,542 B2
(45) Date of Patent: Jun. 16, 2020

(54) SYSTEM AND METHOD FOR MONITORING A PREMISES BASED ON PARSED CODEC DATA

(71) Applicant: SENSORMATIC ELECTRONICS, LLC, Boca Raton, FL (US)

(72) Inventors: James Trani, Billerica, MA (US); Irene Lam, Plainville, MA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 13 days.

(21) Appl. No.: 15/138,571

(22) Filed: Apr. 26, 2016

(65) Prior Publication Data
US 2017/0309143 A1   Oct. 26, 2017

(51) Int. Cl.
*G06T 7/20*   (2017.01)
*G08B 13/196*   (2006.01)
(Continued)

(52) U.S. Cl.
CPC ....... *G08B 13/1961* (2013.01); *G06F 16/786* (2019.01); *G06F 16/7864* (2019.01);
(Continued)

(58) Field of Classification Search
CPC .................................................. G08B 13/1961
See application file for complete search history.

(56) References Cited

U.S. PATENT DOCUMENTS

| 7,072,398 B2 * | 7/2006 | Ma | H04N 19/51 |
| | | | 348/416.1 |
| 8,416,296 B2 * | 4/2013 | Cobb | G06K 9/00785 |
| | | | 348/143 |

(Continued)

FOREIGN PATENT DOCUMENTS

| CN | 102 867 386 | 1/2013 |
| EP | 1 173 020 | 1/2002 |

(Continued)

OTHER PUBLICATIONS

Xu et al, "An Efficient and Robust System for Multiperson Event Detection in Real-World Indoor Surveillance Scenes", IEEE Transactions on Circuits and Systems for Video Technology, vol. 25 No. 6. (Year: 2015).*

(Continued)

*Primary Examiner* — Chikaodili E Anyikire
(74) *Attorney, Agent, or Firm* — Foley & Lardner LLP

(57) ABSTRACT

This document describes a monitoring system for detecting conditions at a physical premises. The monitoring system can receive, by a computing system, from a video sensor system deployed at the physical premises, block-based encoded video data encoded with a block-based encoder in the video sensor system. The monitoring system can parse, by the computing system, the block-based encoded video data to extract from the block-based encoded data macroblock arrays that correspond to areas of a frame of video data. The monitoring system can reduce, by the computing system, the macroblock arrays to one or more data clusters. The monitoring system can apply, by the computing system, a pattern recognition algorithm to the one or more data clusters to detect patterns in the one or more data clusters.

20 Claims, 6 Drawing Sheets

(51) Int. Cl.
*H04N 19/70* (2014.01)
*H04N 19/176* (2014.01)
*G06N 5/04* (2006.01)
*G06N 3/04* (2006.01)
*H04N 21/234* (2011.01)
*G06K 9/00* (2006.01)
*G06F 16/783* (2019.01)

(52) U.S. Cl.
CPC ...... *G06K 9/00711* (2013.01); *G06K 9/00771* (2013.01); *G06N 3/0427* (2013.01); *G06N 5/047* (2013.01); *H04N 19/176* (2014.11); *H04N 19/70* (2014.11); *H04N 21/23418* (2013.01)

(56) References Cited

U.S. PATENT DOCUMENTS

| | | | |
|---|---|---|---|
| 2010/0201820 A1* | 8/2010 | Lopota | G08B 13/1961 348/152 |
| 2013/0273968 A1* | 10/2013 | Rhoads | G06K 9/6253 455/556.1 |
| 2014/0063236 A1* | 3/2014 | Shreve | G06K 9/00228 348/143 |
| 2015/0278585 A1 | 10/2015 | Laksono et al. | |
| 2015/0341633 A1* | 11/2015 | Richert | H04N 19/50 375/240.16 |

FOREIGN PATENT DOCUMENTS

| | | |
|---|---|---|
| EP | 2 023 269 | 2/2009 |
| EP | 2 654 299 | 10/2013 |

OTHER PUBLICATIONS

"An Efficient and Robust System for Multiperson Event Detection in Real-World Indoor Surveillance Scenes,", Xu Jingxin et al., IEEE Transactions on Circuits and Systems for Video Technology, Jun. 1, 2015, vol. 25, No. 6, pp. 1063-1076.

Search Report for International Application No. PCT/US2017/028792, dated Jun. 27, 2017, 12 pages.

International Preliminary Report on Patentability for International Application No. PCT/US2017/028792, dated Nov. 8, 2018, 10 pages.

* cited by examiner

SYSTEM AND METHOD FOR MONITORING A PREMISES BASED ON PARSED CODEC DATA

BACKGROUND

This description relates to operation of video monitoring networks such as those used for security, intrusion and alarm systems installed on industrial, commercial, or residential premises.

It is common for businesses, homes, and other premises to have various types of systems for monitoring the premises by recording video, which can be used to determine if there is an emergency on the premises, such as intrusion, fire, accident, or other emergency situation that may require an alarm condition or other alert.

Systems that are deployed on a physical premises for monitoring and surveillance of the physical premises can include imaging devices, such video cameras. Video data are acquired by the imaging devices and raw video data are encoded using a codec (video encoder/decoder) such that encoded data can be communicated using fewer network resources than would be needed for communicating the raw video data.

SUMMARY

As described herein, the encoded video data is sent to a monitoring system and is used directly by the monitoring system prior to decoding of the encoded data by a decoder in a codec at the monitoring system, which returns the video data to its original format. The monitoring system thus processes video with a lower latency.

The monitoring system analyzes the encoded data. The analysis can include thresholding the data, comparing the encoded data to predefined criteria, or applying "deep learning" and "behavioral pattern recognition" analysis techniques to the encoded data to determine if an emergency state exists on the premises. If the monitoring system determines that the emergency state exists, an alert, notification, or other prompt can be sent to an authorized user, such as a police dispatcher, a property owner, security service, medical service, or other user of the monitoring system.

According to an aspect, a method for detecting conditions at a physical premises includes receiving, by a computing system, from a video sensor system deployed at the physical premises, block-based encoded video data encoded with a block-based encoder in the video sensor system, parsing, by the computing system, the block-based encoded video data to extract from the block-based encoded data macroblock arrays that correspond to areas of a frame of video data reducing, by the computing system, the macroblock arrays to one or more data clusters and applies, by the computing system, a pattern recognition algorithm to the one or more data clusters to detect patterns in the one or more data clusters.

The following may be included in one or more implementations.

The monitoring system determines, by the computer system, from the detected patterns, irregularities in the one or more data clusters, which correspond to an occurrences of an event at the physical premises. In some implementations, the monitoring system applies rules to the event to determine a response. In some implementations, the response is an alert and the monitoring system generates an alert based on the determined event and sends the generated alert to a user device. In some implementations, the one or more macroblock arrays comprise inter-prediction motion prediction vectors. In some implementations, the one or more macroblock arrays comprise intra-prediction motion prediction modes. In some implementations, the one or more macroblock arrays comprise color transform data. In some implementations, reducing the one or more macroblock arrays to one or more data clusters applies one or more of principal component analysis, factor analysis, and cluster analysis. In some implementations, using a pattern recognition algorithm comprises implementing an artificial neural network pattern recognition algorithm. In some implementations, the encoded video data is compressed using one of the H.264 codec and the H.265 codec. In some implementations, the one or more macroblock arrays comprise macroblock density data.

Other aspects include systems and computer program products.

An advantage of using the embedded motion data directly is that fewer computer operations are required for monitoring, processing, and analysis of the data. Detailed motion analysis can be performed using embedded motion data directly. An advantage of the current system includes processing and analysis of higher video resolutions for monitoring a premises. High definition image processing and analysis can be performed.

The details of one or more embodiments of the invention are set forth in the accompanying drawings and the description below. Other features, objects, and advantages of the invention is apparent from the description and drawings, and from the claims.

DETAILED DESCRIPTION

Described is a monitoring system that uses encoded video data for monitoring a physical premises. The encoded video data is analyzed by the system to determine if an emergency situation has occurred or is occurring, such as a fire, invasion or other security breach, property damage, personal injury, or other such emergency situation. A message, such as a prompt, alert, call, text description, or other message can be sent to a user of the monitoring system. A user of the monitoring system can include a police dispatcher, property owner, police officer, security officer, or any other party authorized to monitor the physical premises.

Figure 1:
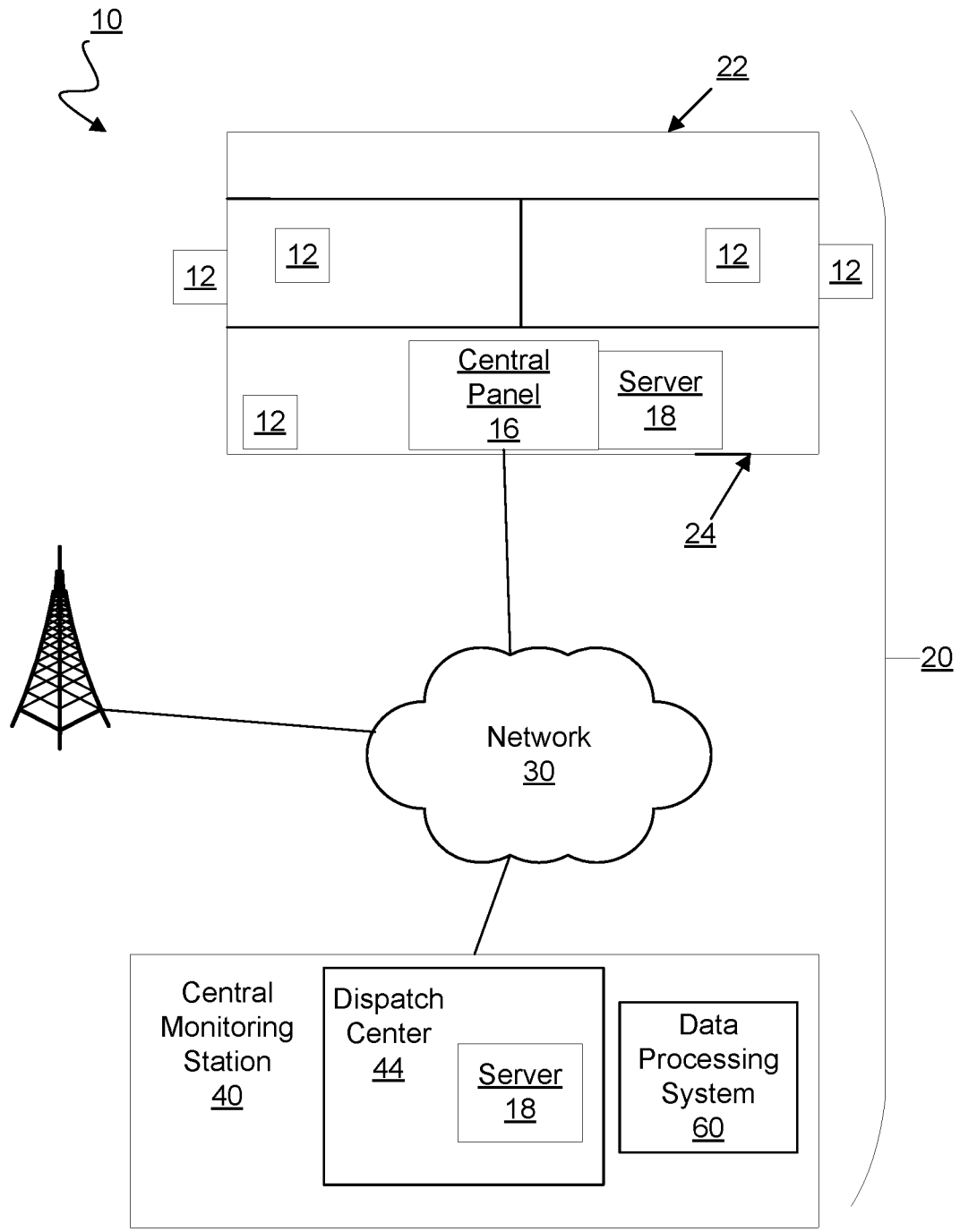
FIG. 1 is a schematic of an exemplary monitoring system.

Referring now to FIG. 1, an example deployment 10 of a monitoring system 20, for example an intrusion detection system, installed at a premises 24, is shown. In this example, the premises 24 is a commercial premises, but the premises 24 may alternatively be any type of premises or building, e.g., industrial, etc. The monitoring system 20 includes a central panel 16, the data processing system 60, and sensors/cameras 12 disbursed throughout the premises 24. The monitoring system 20 is in communication with a central monitoring station 40 (also referred to as central monitoring center) via one or more data or communication networks 30 (only one shown), such as the Internet; the phone system or cellular communication system being examples of others. The central panel 16 receives signals, such as encoded video data 54, from several cameras/sensors 12 that send to the central panel 16 information about the status of the monitored premises 24. The encoded data 54 are forwarded to the data processing system 60. A rules engine (not shown) checks the processed data. When a particular circumstance or event is determined to have occurred, such as an emergency event (e.g., an intrusion), the rules engine generates a message to be transmitted to an authorized user.

The cameras 12 generate video data. Video data can include video and image data at varying frame rates and resolutions. For example, the video data can be high definition video, such as 4 megapixel resolution, at 30 frames per second. In another example, the video data can have a resolution of 640×480 and a frame rate of 10 frames per second. Other frame rates and resolutions are possible. The cameras can encode the video data using an encoder 52. The encoded data 54 can have a smaller data footprint than the video data and can facilitate transmission of the data. The cameras 12 can monitor different areas of the physical premises 24 or overlapping areas of the physical premises 24. The cameras 12 can be calibrated such that the monitoring system 20 can compare data received from cameras 12 monitoring the overlapping areas of the physical premises for data redundancy to improve system veracity and reduce false alarms. For example, data from each camera 12 can be marked using an identifier. A rules engine 72 (described in more detail with respect to FIG. 2, below) can use such an identifier to determine that the data is being received from cameras 12 set up to "double-check" one another, affecting how the data are interpreted or weighted for use in determining if an event has occurred and determining a response, such as transmitting a message.

The central panel 16 functions as a hub for the cameras 12 on the physical premises 24. The central panel 16 sends the received signals to the data processing system 60, using the network 30 if the data processing system is not local. The central panel 16 manages the signals such that the data processing system 60 is able to process the encoded data 54 from each of the cameras 12. In some implementations, the central panel 16 passes the signal directly to the data processing system 60. In some implementations, the central panel 16 multiplexes the encoded data, holds unprocessed data in a buffer, or otherwise stores the received data 54 until the data processor 60 is available (e.g., has available resources) to process the encoded data 54. In some implementations, a server 18 manages a database (not shown) to store historical data for later access. An exemplary central panel 16 includes a processor and memory, storage, a user interface and a network interface card (NIC) coupled via a bus (all not shown). The user interface can include a physical screen, buttons, knobs, or the like, such that a user present at the physical premises can adjust the monitoring system 20 settings, such as turning the monitoring system 20 off or on; run system diagnostics; check the viewing angle of each camera 12; and adjust or perform other system 20 maintenance or operation.

Also shown in FIG. 1 is the central monitoring station 40. In some implementations, the central monitoring station 40 can communicate with many monitoring systems 20 at different physical premises 20. In some implementations, a dispatch center 44 is part of the central monitoring station 40. The dispatch center 44 includes personnel stations (not shown) and server(s) systems 18 running a program that populates a database 76 (not shown) with historical data. In one implementation, the central monitoring station 40 receives encoded video data 54 from one or more of the cameras 12 at the physical premises 24.

In some implementations, the dispatch center 44 receives message data detailing the event that has occurred and a recommended response. For example, one or more of the server 18 and data processing system 60 can be present at the physical premises 24. The processing of the encoded data 54 can be done at the physical premises 20 to reduce network usage. In such an example, the message data is sent from the monitoring system 20 to the dispatch center 44 when the monitoring system 20 determines that a response is needed, such as an alert status or emergency status.

In some implementations, the message data can be sent directly from the monitoring system 20 to an authorized user, such as an owner of the physical premises 20, in addition or instead of the dispatch center 44. In some implementations, the dispatch center 44 is considered an authorized user of the monitoring system 20.

Figure 2:
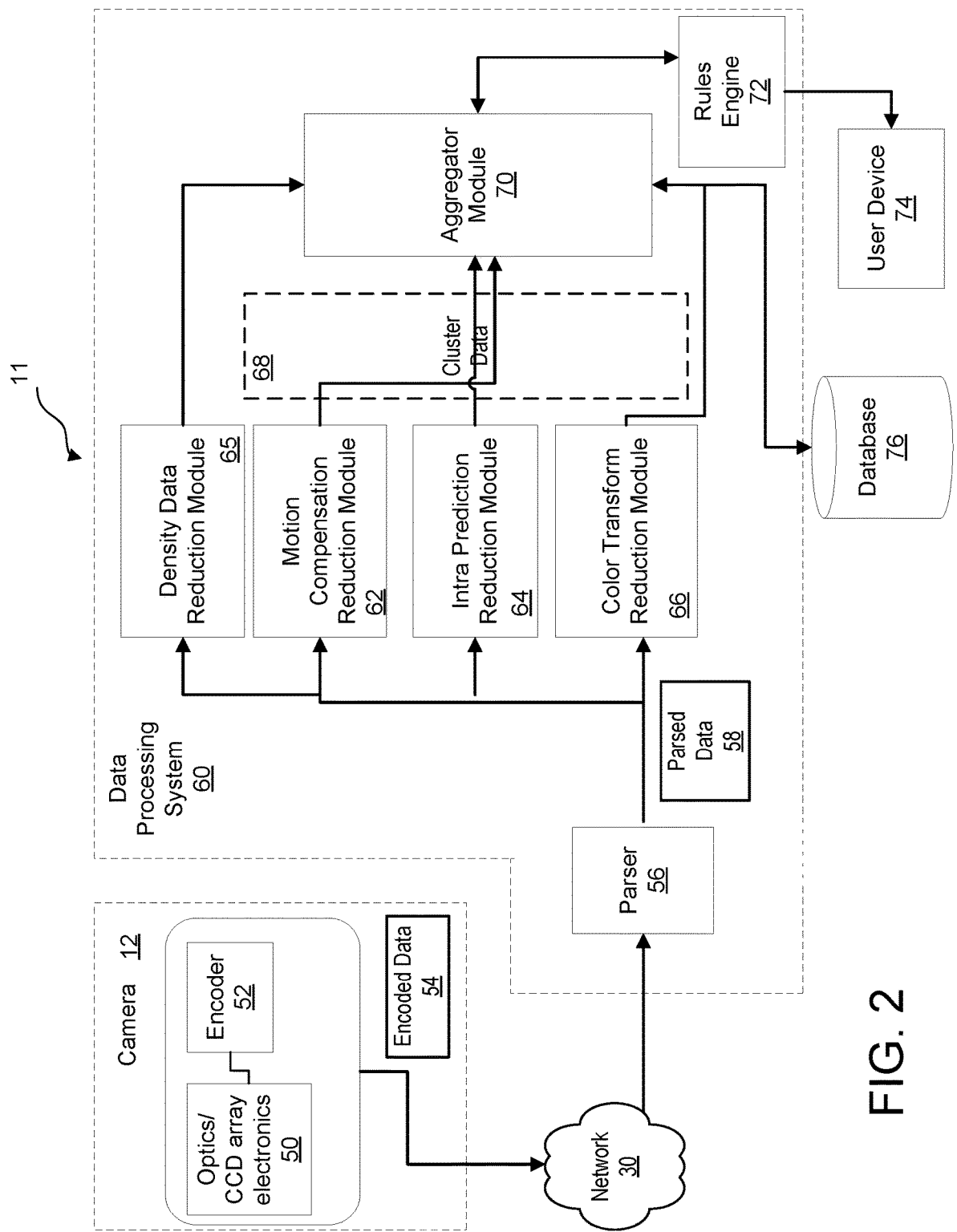
FIG. 2 is a schematic diagram of dataflow for the monitoring system.

Referring now to FIG. 2, shows details of the deployment 11 of FIG. 1. The monitoring system 20 monitors the physical premises 24 by capturing sensor data. One type of sensor data are video data captured by one or more cameras 12. The camera 12 encodes the captured data using an encoder 52 and sends the encoded data 54 to the data processing system 60 using the network 30. The data processing system 60 receives the encoded data 54 using an interface (not shown) and routs the data to a parser 56. The parser receives the encoded data 54 and parses the encoded data to extract encoding information from a bitstream representing the encoded data. The parser can also identify the extracted data type for later use. The parsed data 58 are sent to one or more modules depending on the identified type of data. For example, motion vector data can be sent to at least the motion compensation reduction module 62, and color transform data can be sent to at least the color transform reduction module 64. Once each module has reduced received data to a cluster type, the cluster data 68 are sent to an aggregator module 70. The aggregator module 70 can apply one or more pattern recognition algorithms to the cluster data 68. For example, aggregator may determine that movement occurred at a particular location on the physical premises. Pattern information is sent to a rules engine 72. The rules engine determines whether the pattern information represents the occurrence of an event at the physical premises (e.g., an intrusion) and determines a response (e.g., take no action, send a message to an authorized user, etc.).

The camera 12 can be any device that can record video data, such as a mobile phone, digital camera, web camera, video camera, and the like. The camera 12 includes a sensor 50 for recording image data. An encoder 52 is included, typically in the camera 12 or as a discrete device. The encoder 52 receives the image data from the sensor 50 output of the camera 12 and encodes the image data (described in more detail relating to FIG. 4, below) into a format that is used for transmission. For example, the image data can be encoded using block-based motion compensation and a transform-based coding framework that take advantage of spatial and temporal redundancy in a sequence of images in the image data to compress the image data. Video coding standards such as H.264/AVC (Advanced Video Coding) or H.265 can be used, though other, nonstandard encoding approaches can be used as well.

The data processing system 60 receives the encoded data 58 and prepares the data for analysis by the aggregator module 70 and the rules engine 72. The data processing system 60 can include the data processing system 60 described in further detail in relation to FIG. 6. The exemplary data processing system 60 includes the parser 56, a plurality of modules for processing the parsed data 58, the aggregator module 70, and the rules engine 72.

The encoded data 54 are received by the parser 56. The parser 56 extracts the encoding information to generate parsed data 58. The encoded data 54 is decompressed by the parser 56 such that syntax elements specifying are produced from code words in the encoded bitstream. The series of syntax elements can specify the coding modes used by the encoder 52 (e.g., context adaptive variable length coding, context adaptive binary arithmetic coding, etc.), motion vectors, quantized coefficients, and the like. For example, the parser 56 extracts motion compensation data, such as the motion vector, from the bitstream and associates the extracted data with an identifier for later use. The parser 54 can be part of the camera 12, part of the data processing system 60, or a stand-alone module. For example, the camera 12 can send only the parsed data 58 over the network 30 to the data processing system 60 in order to reduce the usage of network resources.

Figure 4:
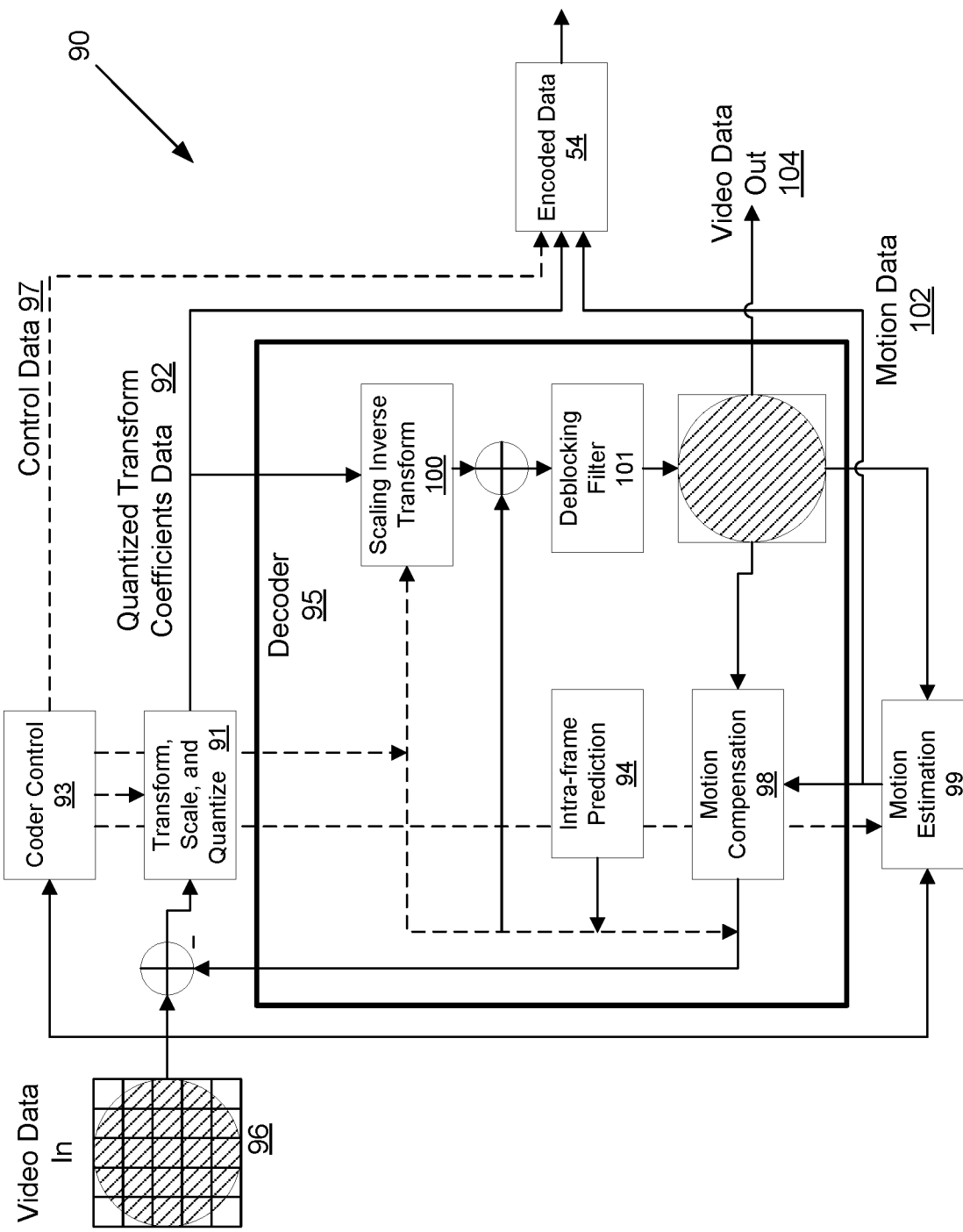
FIG. 4 is a schematic of an exemplary codec.

In some implementations, the parser 54 can extract motion vector data, quantized coefficient data, color transform vectors, inter-prediction data, intra-prediction data, macroblock density data, and other data from the encoded data (described in greater detail in relation to FIG. 4).

The parsed data 58 can be sent to a plurality of modules for processing. In some implementations, the data processing system can include a motion compensation reduction module 62, an intra-prediction module 64, a density data module 65, and a color-transform module 66. Each module receives a portion of the parsed data 58. In some implementations, the motion compensation reduction module 62 receives motion vector data. In some implementations, the intra-prediction module 64 receives intra-frame data which can include gradient density information. In some implementations, the density data reduction module 65 receives frame density data. Frame density data can include a number of sub-blocks being used within each macroblock. In some implementations, the color transform reduction module 66 receives color values. Color values can be YUV (e.g., brightness, luminance or luma, and chroma) values which are transformed to HSV (e.g., hue, saturation, and lightness or color value) values. The parsed data 58 can include transform coefficients for each module. The parsed data 58 can include macroblock array data, intra-frame prediction data, motion data, and color transform data (described in greater detail in relation to FIG. 4).

A module reduces the parsed data 58 into cluster data 68. In some implementations, the parsed data 58 is reduced by the module using techniques such as principal component analysis (PCA), factor analysis, or cluster analysis. The clusters identify relationships in the parsed data 58. Each form of analysis generates statistical information that represents one or more macroblock regions, frames, or data types. The cluster data 68 is a statistical association of the data for each data type. For example, the motion compensation reduction module 62 can encapsulate motion vector data for a frame for analysis by the aggregation module 70. The cluster data can indicate trends in the encoded data 54 that can be identified by the aggregator module 70 and flagged for the rules engine 72.

The aggregator module 70 may receive cluster data 68 indicating uninteresting macroblock data that does not need to be analyzed further (such as if there is no motion for a portion of the image data. For example, the aggregation module 70 can receive principal components, factors, or clustering data indicating motion for a frame or series of frames. The aggregation module 70 truncates and concatenates the data arrays for those portions of the cluster data 68 that exhibit no significant changes. The aggregation module 70 aggregates and transforms the data arrays using pattern recognition algorithms such that the cluster data 68 becomes more manageable for rules engine 72 In some implementations, the cluster data 68 contain related data, such as motion vector data, from a specific period of time that can be analyzed by the aggregator module 70 for patterns and compared with cluster data 68 from other modules (e.g. the color transform vector data) for that period of time to determine if a pattern exists.

In some implementations, the aggregator module 68 can cross-compare interesting data received from the one or more modules of the data processing system 60 to determine if a pattern exists or to confirm that a pattern exists. For example, motion vector data can indicated that there was a sudden motion over the last set of received image data frames for a given macroblock region. The color transform vector data can be used to confirm that a color gradient experienced significant change for the same macroblock region over the same period of time. This could indicate, for example, a slip-and-fall incident on a physical premises 24.

The cluster data 68 that has been aggregated and analyzed for patterns and for object recognition is sent to a rules engine 72. The rules engine 72 checks the determined patterns and classified objects and determines whether message data should be sent to the user device 74. In some examples, the rules engine may determine that the recognized pattern indicates that nothing is wrong or that normal activity is taking place for a particular physical premises 24 or for a particular time of day.

For example, a department store can be expected to be full of people moving through the store during operating hours but might not be expected to have people moving though the store when the store is closed. The rules engine 72 can be programmed for a particular premises 24 to ensure that message data are sent only under circumstances specified by the user.

In another example, different types of message data are sent by the rules engine 72 depending on the type of pattern or object that is recognized from the processed encoded video data. For example, the monitoring system 20 can initiate a call to the police when the processed decoded data indicates a likelihood of detection of an intruder, whereas the monitoring system 20 can simply send a text message to the user device 74 when the processed data indicates that a front door has been left open for too long a period of time.

The encoded data 54, the parsed data 58, the cluster data 68, the aggregated data, and the message data, can be transmitted over a network 30. The network 30 can include a wireless device 141. Wireless device 141 can include Wi-Fi routers, Wi-Fi access points, wireless tracking devices, beacons, computing devices, laptops and so forth. In some examples, wireless device 141 includes cellular networks such as LTE networks. The wireless device 141 can communicate via the network 30 to the monitoring system 20 and communicate with the user device 74, the rules engine 72, the aggregator module 70, and the data processing system 60. In some examples, wireless device 141 can be a fixed location wireless device, such as fixed location router or computer. In other examples, wireless device 141 can be discoverable (e.g., by the monitoring system 20), when one or more of wireless devices 141 are connected to a network or connected to a port.

Parsed data 58 includes macroblock arrays from the encoded data 54 which have been separated from the image data for separate processing by the data processing system 60. The macroblock arrays include a macroblock array of inter-prediction motion prediction vectors. The macroblock arrays include a macroblock array of color transforms. The macroblock arrays include a macroblock array of intra-prediction modes. The macroblock arrays include macroblock density data. The parsed data 58 can be sent in real time to the data processing system 60 or periodically. The parser 56 can use a pipelined architecture to reduce the overall reaction time of the system when operating in real-time and to ensure that the freshest available image data is being sent to the data processing system 60.

Message data can include information such as an instruction, question, alert, notification, or other such information. The message data can be transmitted in the format of an SMS message, IVR message, email, push notification, telephone call, or a similar format. The aggregator module 70 can designate the conditions in which the rules engine 72 generates and transmits message data 162 to the user device 74. Once message data has been generated by the rules engine 72, the message data can be transmitted to the user device 74 using the network 30.

The user device 74 can be used to receive the message data from the rules engine 72. The user device 74 can include a computer processor, a means for receiving message data, and a user interface. The user device 74 can be a computer, mobile phone, tablet, laptop, radio receiver, or other such device. The user device 74 can be a wireless device which can connect to the Internet. The user device can receive the message data and render an image on a user interface such that the authorized user can interpret the message.

The database 76 can store data of the monitoring system 20. The database 76 can include a single device or a network of devices. The database 76 can also store programs used by the monitoring system 20, such as the programs of the data processing system 60, the aggregator module 70, or the rules engine 72. The database 76 can be local to the monitoring system 20 or in a remote location. The database 76 can communicate with the rest of the monitoring system 20 using the network 30.

Figure 3:
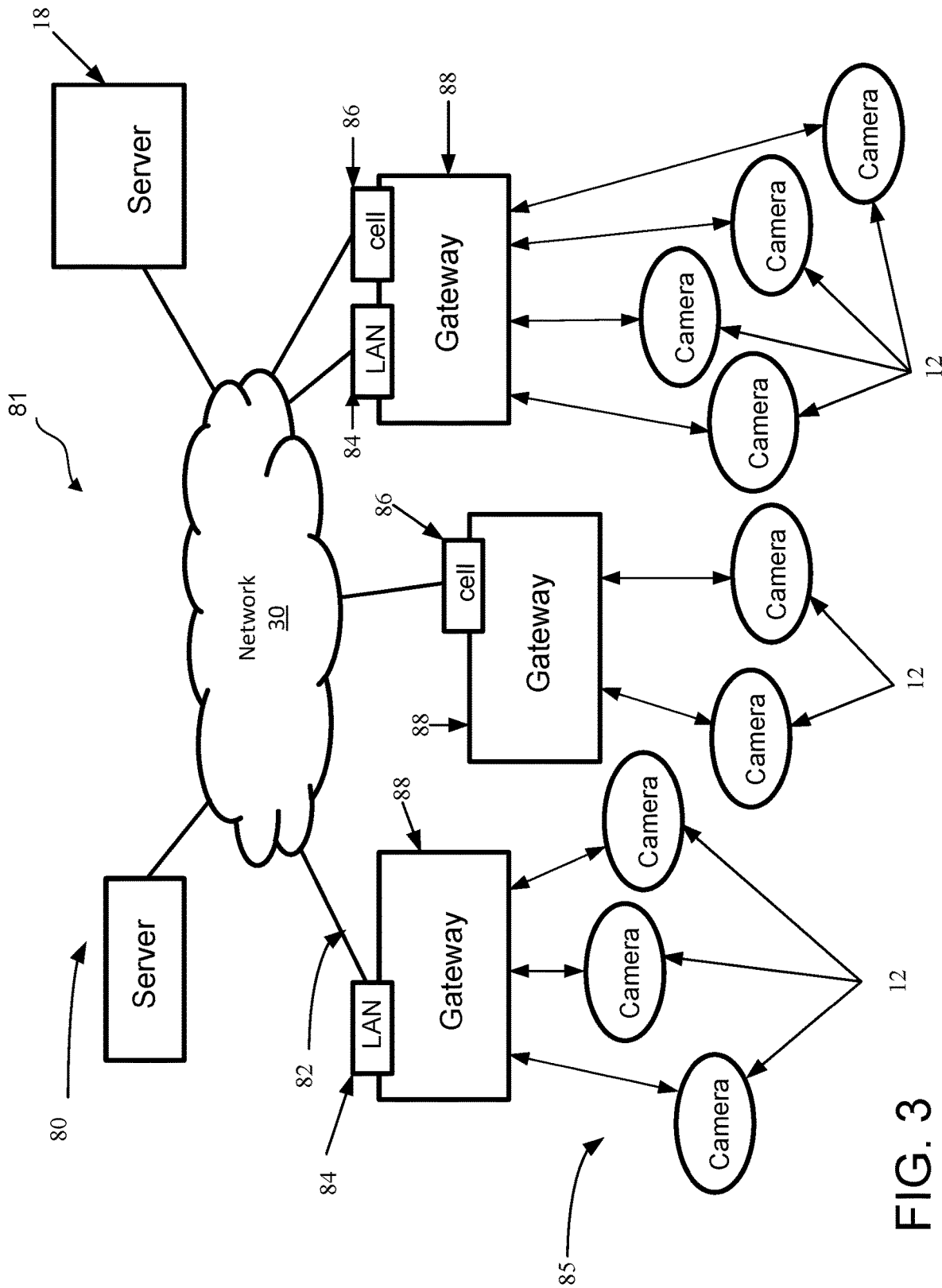
FIG. 3 is a schematic diagram of an exemplary monitoring system network.

Referring now to FIG. 3, an exemplary (global) distributed network topology for a monitoring system 20 is shown. In FIG. 3 the monitoring system 20 is a distributed network 81 that is logically divided into a set of tiers or hierarchical levels 80-85.

In an upper tier or hierarchical level 80 of the network are disposed servers and/or virtual servers 18 running a "cloud computing" paradigm that are networked together using well-established networking technology such as Internet protocols or which can be private networks that use none or part of the Internet. Applications that run on those servers 18 communicate using various protocols such as for Web Internet networks XML/SOAP, RESTful web service, and other application layer technologies such as HTTP and ATOM. The monitoring system 20 has direct links between devices (nodes) as shown and discussed below.

In one implementation hierarchical level 80 includes a central processing station 40 comprised of one or more of the server computers 18 and which includes or receives information from a parser 58, data processing system 60, and aggregator module 70 as will be described below.

The distributed network 81 includes a second logically divided tier or hierarchical level 82, referred to here as a middle tier that involves gateways 88 located at central, convenient places inside individual buildings and structures. These gateways 88 communicate with servers 18 in the upper tier whether the servers are stand-alone dedicated servers and/or cloud based servers running cloud applications using web programming techniques. The middle tier gateways 88 are also shown with both local area network 84 (e.g., Ethernet or 802.11) and cellular network interfaces 86. In some embodiments wired cameras (not shown) can be included in aspects of the distributed network 81.

Each gateway 88 is equipped with an access point (fully functional camera node or "F" camera node) that is physically attached to that access point and that provides a wireless connection point to other nodes in the wireless network. The links (illustrated by lines not numbered) shown in FIG. 3 represent direct (single-hop MAC layer) connections between devices. A formal networking layer (that functions in each of the three tiers shown in FIG. 3) uses a series of these direct links together with routing devices to send messages (fragmented or non-fragmented) from one device to another over the network.

The distributed network 81 includes a third logically divided tier or hierarchical level 85 that involves one or more cameras 12. An exemplary camera 12 includes a processor device, e.g., a CPU and or other type of controller device that executes under an operating system, generally with 8-bit or 16-bit logic for simple camera or 32 and 64-bit logic for integrated camera 12. The camera 12 can have a relatively small flash/persistent store and volatile memory in comparison with other the computing devices on the network. The camera 12 can have a network interface card that interfaces the camera to the network 30. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The camera also includes a sensor element 50 and a sensor interface that interfaces to the processor. Sensor 50 can be a CCD array sensor, a CMOS sensor, or other image-capturing sensor.

FIG. 4 shows an example codec 90 having a coder control 93 and a decoder 95. An input frame 96 of the video data is divided into macroblock regions. Each macroblock is used for constructing predicted frames in typical decoding and associated with transform coefficients. Transform coefficients are generated by the encoder using a transform process (e.g., discrete cosine transform). The transform coefficients are produced for the macroblocks of the frame and together represent quantized transform coefficients data 92. Control data 97 can be retained. The transform coefficients data 92 can be scaled (e.g., quantized) to reduce data footprint. The transform coefficients data 92 can be re-ordered and encoded using entropy code (e.g., context-adaptive variable length coding, context adaptive binary arithmetic coding, etc.). The encoded coefficients, together with side information required to decode the macroblock (e.g. macroblock prediction mode, quantizer step size, motion vector information, etc.) form the encoded data 54 (e.g., a compressed bitstream).

For the codec 90 to restore the input frame 96, the decoder 96 is used. The quantized macroblock coefficients data 92 are decoded in order to reconstruct a frame for encoding of further macroblocks. The transform coefficients data 92 are re-scaled and inverse transformed using a scaling inverse transform 100 (e.g., an inverse discrete cosine transform). A difference macroblock is generated. A prediction macroblock is added to the difference macroblock to produce a reconstructed macroblock, which is a distorted version of the original macroblock due to encoding data loss. A deblocking filter 101 is applied to reduce the effects of blocking distortion at the block boundaries and reconstructed reference frame 104 is produced from a series of macroblocks reconstructed macroblocks.

The parser 56 extracts information from the encoded data 54 using the decoder 96 of the codec 90. For example, the quantized transform coefficients data 92 can be sent to the one or more modules 62, 64, 65, 66. In some implementations, intra-frame and inter-frame prediction data 94, which are generated using I-frames (e.g., key frames or reference frames), is combined with transform and scaling information 91 using, for example, motion compensation 98 to produce (in this case) motion estimation data 99. The intra-frame prediction data 94 is generated using a prediction mode of the codec 96. Samples are predicted using previously decoded samples from the macroblocks proximate to the macroblock being decoded. Motion data 102 is generated using the motion compensation 98 and motion estimation 99 modules. The frame density data (not shown) can include the number and sizes of the macroblocks being analyzed. For example, a macroblock, which can be typically a size of 16×16 pixels, can be subdivided into one or more 8×8 pixel blocks or 4×4 pixel blocks to enhance compression fidelity in complex regions of a frame. The size of a macroblock can be extracted from the encoded data 54 by the parser. The motion data 102, intra-frame prediction data 94, frame density data, and color transform data (not shown) are sent by the parser 56 to the one or more modules 62, 64, 66 along with the quantized transform coefficients data 92 for use in generating cluster data 68. In some implementations, the intra-frame prediction data 94 and frame density data can be provide information indicating an anomaly, even if no motion is detected. For example, frame density information can be compared to a calibrated image (e.g., an "all clear" image) such that an object that is out of place or obstructing a path can be detected. For example, if a jar falls off a shelf at a supermarket and spills its contents on the floor of an aisle, the density data for a particular portion of the image will indicate a change in the uniformity of the floor of the aisle from what is considered nominal. For example, a region of a frame might normally have large macroblocks, indicating uniform image data, but if a new object is introduced to the region, the macroblock size might be reduced by the encoder to preserve image fidelity, which can be interpreted as an anomaly. The aggregator module 70 and the rules engine 72 could determine that the floor is covered in debris, which could be dangerous, and decide to send an alert to the manager. As time passes, the rules engine 72 could determine that more messages need be sent (e.g., at an increasing frequency) until the nominal situation is restored.

Figure 5:
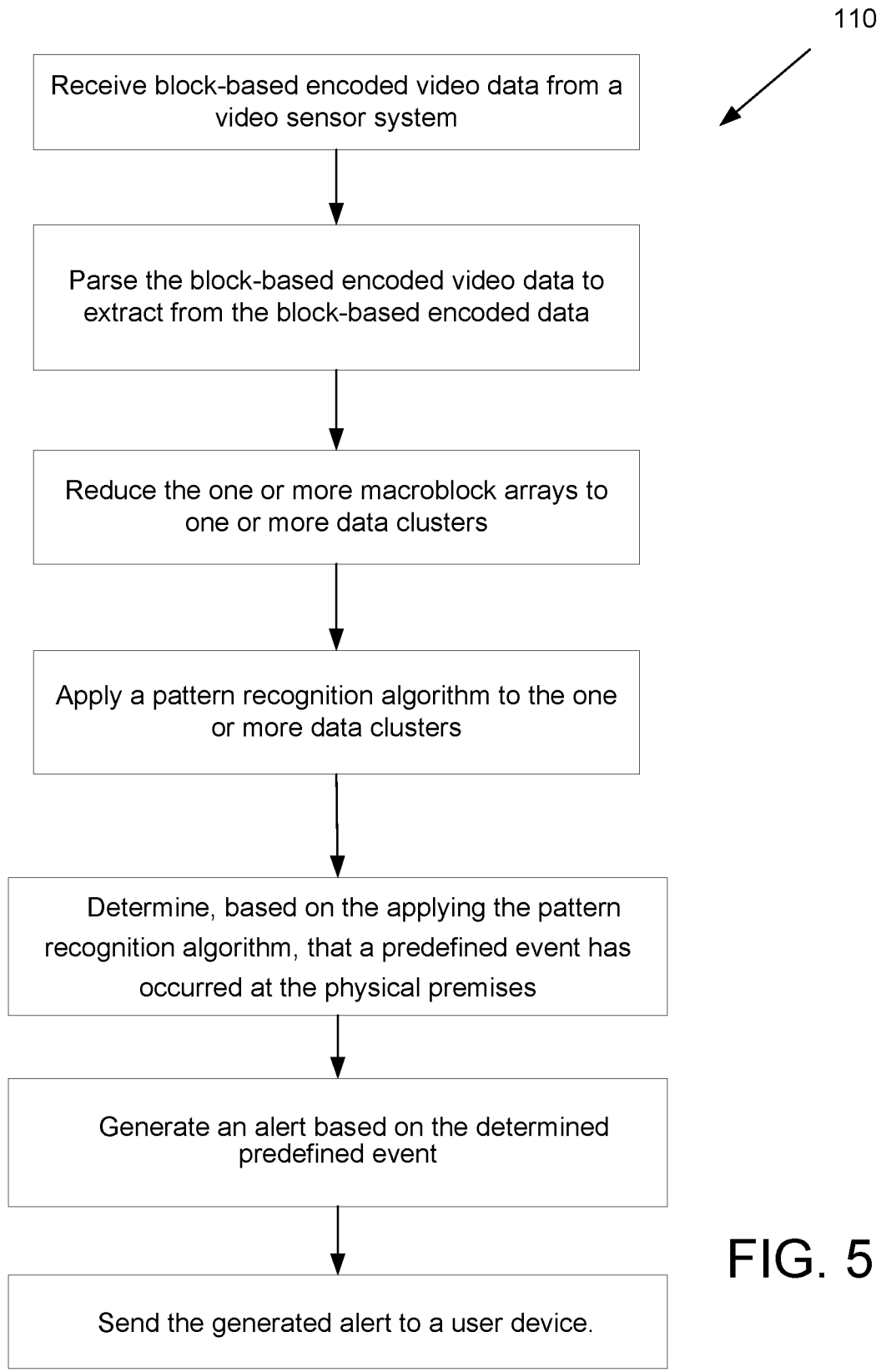
FIG. 5 is a flow diagram showing processing using encoded video data of potential events at a physical premises.

Referring now to FIG. 5, a block diagram 110 shows a process for detecting conditions at a physical premises. At step 102, the monitoring system receives from a video sensor system deployed at the physical premises, block-based encoded video data that were encoded with a block-based encoder in the video sensor system. At step 104, the monitoring system parses the block-based encoded video data to extract from the block-based encoded data macroblock arrays that correspond to areas of a frame of video data. At step 106, the monitoring system reduces the macroblock arrays to one or more data clusters, and analyzes the data clusters to detect changes in the data clusters from frame to frame. At step 108, the monitoring system can analyze the data clusters by applying one or more pattern recognition algorithms to the data clusters to detect changes in patterns in the data clusters. These pattern recognition algorithms can be any of well-known types such as supervised and unsupervised pattern recognition algorithms, which from changes in the detected patterns, can determine at step 110 whether the changes are irregularities that correspond to an occurrences of an event at the physical premises. At step 112, the monitoring system applies rules to the determined event to formulate an appropriate response. At step 114, a response is sent. In some implementations, the response is an alert that is generated based on the determined event and send to a user device.

Figure 6:
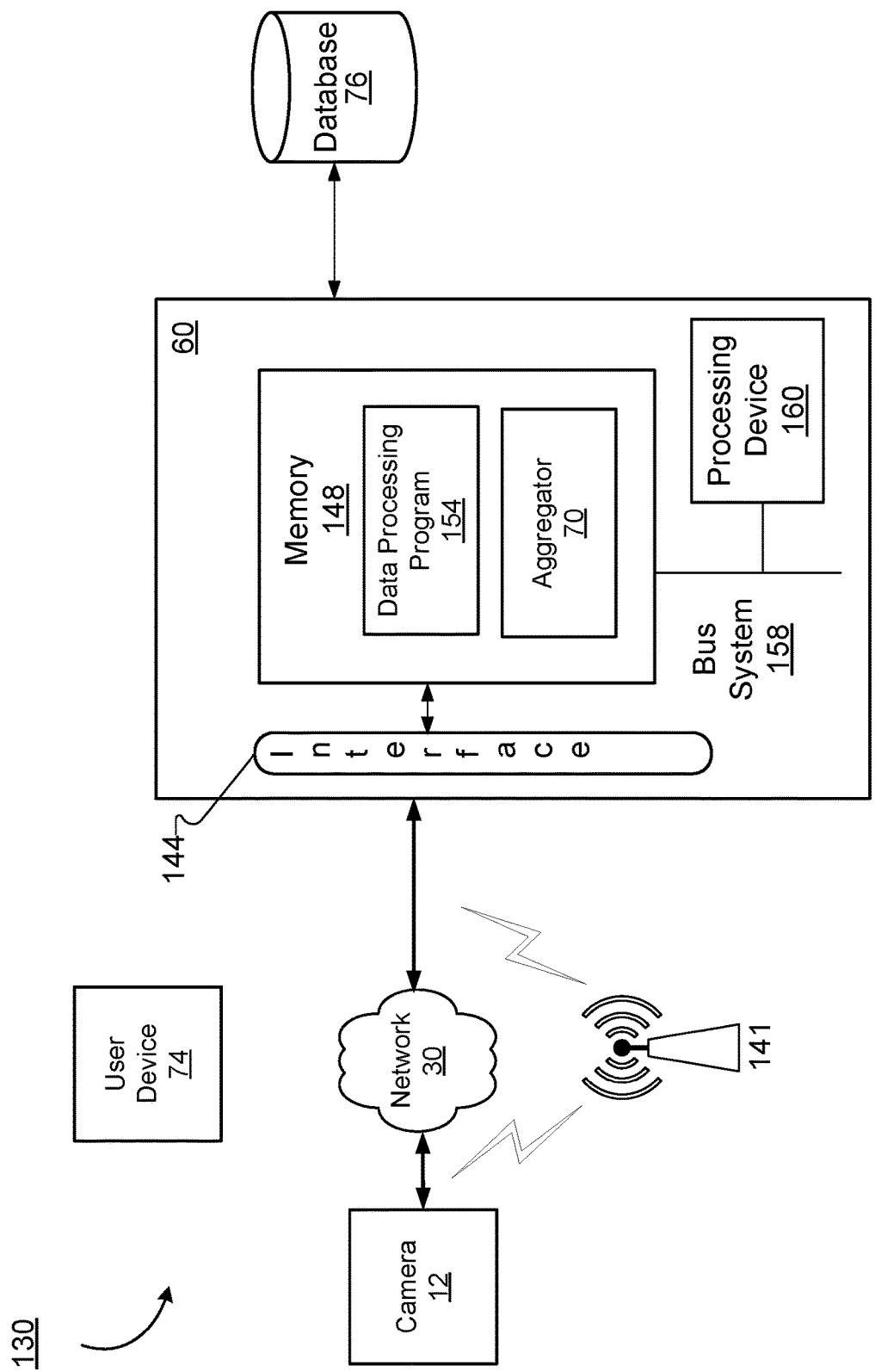
FIG. 6 is a diagram showing components of the device for processing data for the monitoring system.

FIG. 6 is a block diagram 130 showing examples of components of the monitoring system 20. User device 74 can be any sort of computing device capable of taking input from a user and communicating over networks 141, 30 with a data processing system 60 and/or with other client devices. User device 74 can be a mobile device, a desktop computer, a laptop, a cell phone, a personal digital assistant ("PDA"), a server, an embedded computing system, a mobile device and so forth.

The data processing system 60 can be a variety of computing devices capable of receiving data and running one or more services. In an example, system 60 can include a server, a distributed computing system, a desktop computer, a laptop, a cell phone, a rack-mounted server, and the like. The data processing system 60 can be a single server or a group of servers that are at a same position or at different positions (i.e., locations). The data processing system 60 and user device 74 can run programs having a client-server relationship to each other. Although distinct modules are shown in the figures, in some examples, client and server programs can run on the same device. In some examples, the parser 56, the aggregator 70, and other components can be included in the data processing system 60.

System 60 can receive data from the camera 12 and/or client device 74 through input/output (I/O) interface 144. I/O interface 144 can be a type of interface capable of receiving data over a network, including, e.g., an Ethernet interface, a wireless networking interface, a fiber-optic networking interface, a modem, and so forth. System 60 also includes a processing device 160 and memory 148. A bus system 158, including, for example, a data bus and a motherboard, can be used to establish and to control data communication between the components of system 60.

Processing device 160 can include one or more microprocessors. Generally, processing device 160 can include an appropriate processor and/or logic that is capable of receiving and storing data, and of communicating over a network (not shown). Memory 148 can include a hard drive and a random access memory storage device, including, e.g., a dynamic random access memory, or other types of non-transitory machine-readable storage devices. Memory 148 stores computer programs, such as the data processing program 154, which are executable by processing device 160. These computer programs include an aggregator 70 for implementing the operations and/or the techniques described herein. The aggregator 70 can be implemented in software running on a computer device, hardware or a combination of software and hardware.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a processing device. A machine-readable medium can be a machine-readable storage device, a machine-readable storage substrate, a random or serial access memory device, or a combination of one or more of them.

The term "processing device" encompasses all kinds of apparatus, devices, and machines for processing information, including by way of example a programmable processor, a computer, or multiple processors or computers. The apparatus can include special purpose logic circuitry, e.g., an FPGA (field programmable gate array) or an ASIC (application-specific integrated circuit) or RISC (reduced instruction set circuit). The apparatus can also include, in addition to hardware, code that produces an execution environment for the computer program in question, e.g., code that constitutes processor firmware, a protocol stack, an information base management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or information (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input information and generating output. The processes and logic flows can also be performed by, and apparatus can also be implemented as, special purpose logic circuitry, e.g., an FPGA (field programmable gate array) or an ASIC (application-specific integrated circuit) or RISC.

Computers suitable for the execution of a computer program include, by way of example, general or special purpose microprocessors or both, or any other kind of central processing unit. Generally, a central processing unit will receive instructions and information from a read-only memory or a random access memory or both. The essential elements of a computer are a central processing unit for performing or executing instructions and one or more memory devices for storing instructions and information.

Generally, a computer will also include, or be operatively coupled to receive information from or transfer information to, or both, one or more mass storage devices for storing information, e.g., magnetic, magneto-optical disks, or optical disks. However, a computer need not have such devices. Moreover, a computer can be embedded in another device, e.g., a mobile telephone, a smartphone or a tablet, a touch-screen device or surface, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and information include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and (Blue Ray) DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as an information server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital information communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In another example, the server can be in the cloud via cloud computing services. In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method, comprising:
    receiving, by a computing system, from a video sensor system deployed at a physical premises, compressed video data that is encoded and compressed by a block-based encoder in the video sensor system;
    parsing, by the computing system, the compressed video data to extract one or more macroblock arrays that correspond to areas of a frame of the compressed video data, the one or more macroblock arrays comprising motion vector data and color vector data;
    applying, by the computing system, a cluster analysis to reduce the one or more macroblock arrays parsed from the compressed video data to cluster data;
    aggregating, by the computing system, the cluster data over a series of frames;
    identifying, by the computing system, one or more first segments of the cluster data associated with first changes in the motion vector data and the color vector data less than a predefined amount and one or more second segments of the cluster data associated with second changes in the motion vector data and the color vector data greater than the predefined amount;
    truncating and concatenating, by the computing system, the cluster data to remove the one or more first segments and retain the one or more second segments;
    applying, by the computing system, a pattern recognition algorithm to the cluster data to detect one or more irregularities in the cluster data;
    determining, by the computing system, whether the one or more irregularities correspond to an occurrence of one or more events at the physical premises by:
        identifying a time that the motion vector data indicates the one or more events have occurred; and
        analyzing the color vector data at the time to determine that the color vector data confirms that the one or more events have occurred at the time; and when the one or more events are determined,
    applying, by the computing system, the one or more events to a rules engine to determine a response to the one or more events.

2. The method of claim 1, wherein the computing system is part of an intrusion detection system, wherein the rules engine executes one or more rules to detect an intrusion into a premises monitored by the computing system.

3. The method of claim 1, wherein the response is an alert and the method further comprises:
    generating the alert based on the one or more events; and
    sending the alert to a user device.

4. The method of claim 1, wherein the one or more macroblock arrays comprise inter-prediction motion prediction vectors.

5. The method of claim 1, wherein the one or more macroblock arrays comprise intra-prediction motion prediction modes.

6. The method of claim 1, wherein the one or more macroblock arrays comprise color transform data.

7. The method of claim 1, wherein applying, by the computing system, the cluster analysis to reduce the one or more macroblock arrays comprises:
    applying one or more of a principal component analysis and a factor analysis to generated statistical data that is used by the computing system.

8. The method of claim 1, wherein applying, by the computing system, the pattern recognition algorithm comprises applying an artificial neural network pattern recognition algorithm.

9. The method of claim 1, wherein the compressed video data is compressed using one of an H.264 codec and an H.265 codec.

10. The method of claim 1, wherein the one or more macroblock arrays comprise macroblock density data.

11. An intrusion detection system for detecting conditions at a physical premises, the system comprising:
    one or more camera sensors deployed at the physical premises; and
    a central monitoring station, the central monitoring station comprising a data processing system configured to perform operations comprising:
        receiving, from a video sensor system deployed at the physical premises, compressed video data that is encoded by a block-based encoder in the video sensor system;
        parsing the compressed video data to extract from the compressed video data, one or more macroblock arrays that correspond to areas of a frame of the compressed video data, the one or more macroblock arrays comprising motion vector data and color vector data;
        applying a cluster analysis to the one or more macroblock arrays to reduce the one or more macroblock arrays to cluster data;
        aggregating the cluster data over a series of frames;
        identifying one or more first segments of the cluster data associated with first changes in the motion vector data and the color vector data less than a predefined amount and one or more second segments of the cluster data associated with second changes in the motion vector data and the color vector data greater than the predefined amount;
        truncating and concatenating the cluster data to remove the one or more first segments and retain the one or more second segments;
        applying a pattern recognition algorithm to the cluster data to detect one or more irregularities in the cluster data;
        determining whether the one or more irregularities correspond to an occurrence of one or more events at the physical premises by:
            identifying a time that the motion vector data indicates the one or more events have occurred; and
            analyzing the color vector data at the time to determine that the color vector data confirms that the one or more events have occurred at the time; and
        applying the one or more events to a rules engine to determine a response to the one or more events.

12. The system of claim 11, wherein applying the one or more events to the rules engine comprises detecting an intrusion with rules.

13. The system of claim 11, wherein the response is an alert;
  wherein and the operations further comprise:
    generating the alert based on the one or more events; and
    sending the alert to a user device.

14. The system of claim 11, wherein the one or more macroblock arrays comprise inter-prediction motion prediction vectors.

15. The system of claim 11, wherein the one or more macroblock arrays comprise intra-prediction motion prediction modes.

16. The system of claim 11, wherein the one or more macroblock arrays comprise color transform data.

17. The system of claim 11, wherein applying the cluster analysis to the one or more macroblock arrays to reduce the one or more macroblock arrays to the cluster data comprises:
  applying one or more of principal component analysis and factor analysis.

18. The system of claim 11, wherein applying the pattern recognition algorithm comprises applying an artificial neural network pattern recognition algorithm.

19. The system of claim 11, wherein the compressed video data is compressed using one of an H.264 codec and an H.265 codec.

20. One or more machine readable hardware storage devices storing instructions that are executed by one or more processing devices of a data processing system to perform operations comprising:
  receiving, from a video sensor system deployed at a physical premises, block-based encoded video data;
  parsing the block-based encoded video data to extract one or more macroblock arrays that correspond to areas of a frame of video data, the one or more macroblock arrays comprising motion vector data and color vector data;
  applying a cluster analysis to reduce the one or more macroblock arrays to cluster data;
  aggregating the cluster data over a series of frames;
  identifying one or more first segments of the cluster data associated with first changes in the motion vector data and the color vector data less than a predefined amount and one or more second segments of the cluster data associated with second changes in the motion vector data and the color vector data greater than the predefined amount;
  truncating and concatenating the cluster data to remove the one or more first segments and retain the one or more second segments;
  applying a pattern recognition algorithm to the cluster data to detect one or more irregularities in the cluster data;
  determining whether the one or more irregularities correspond to an occurrence of one or more events at the physical premises by:
    identifying a time that the motion vector data indicates the one or more events have occurred; and
    analyzing the color vector data at the time to determine that the color vector data confirms that the one or more events have occurred at the time; and when the one or more events are determined,
  applying the one or more events to a rules engine to determine a response to the one or more events.

* * * * *